United States Patent [19]

Prokop et al.

[11] 3,763,976
[45] Oct. 9, 1973

[54] CLUTCH CONTROLLED TRANSMISSION SHIFT LOCK

[75] Inventors: Josef F. Prokop, Addison; Irvin A. Eickmeyer, La Grange, both of Ill.

[73] Assignee: International Harvester Company, Chicago, Ill.

[22] Filed: Jan. 27, 1972

[21] Appl. No.: 221,341

[52] U.S. Cl.................. 192/3.63, 74/476, 251/285
[51] Int. Cl............................................. B60k 21/00
[58] Field of Search...................... 192/3.63, 87.17, 192/114 R, 3.57

[56] References Cited
UNITED STATES PATENTS

| | | | |
|---|---|---|---|
| 3,352,392 | 11/1967 | Black et al...................... | 192/3.63 X |
| 2,464,538 | 3/1949 | Vanderzee...................... | 192/87.17 |
| 754,638 | 3/1904 | Brennan.......................... | 192/3.63 X |
| 2,206,221 | 7/1940 | Carter............................... | 192/3.63 |
| 2,284,250 | 5/1942 | Ball et al.......................... | 192/3.63 X |
| 2,726,746 | 12/1955 | Herndon et al................ | 192/3.63 X |
| 2,748,910 | 6/1956 | Klecker............................ | 192/3.63 |
| 3,084,773 | 4/1963 | Velte ................................ | 192/3.63 |
| 3,522,867 | 8/1970 | Page et al. ...................... | 192/3.63 |

Primary Examiner—Benjamin W. Wyche
Attorney—Floyd B. Harman

[57] ABSTRACT

An assembly having a dual hydraulic clutch, a master clutch and a coordination means linked therebetween. The coordination means preventing engagement of the hydraulic clutch until the master clutch is disengaged and includes a clutch pedal actuated gate means which alternately bars or allows movement of the hydraulic spool that directs high pressure fluid to the hydraulic clutch. A manual operable lever means is employed to effect movement in the spool.

6 Claims, 5 Drawing Figures

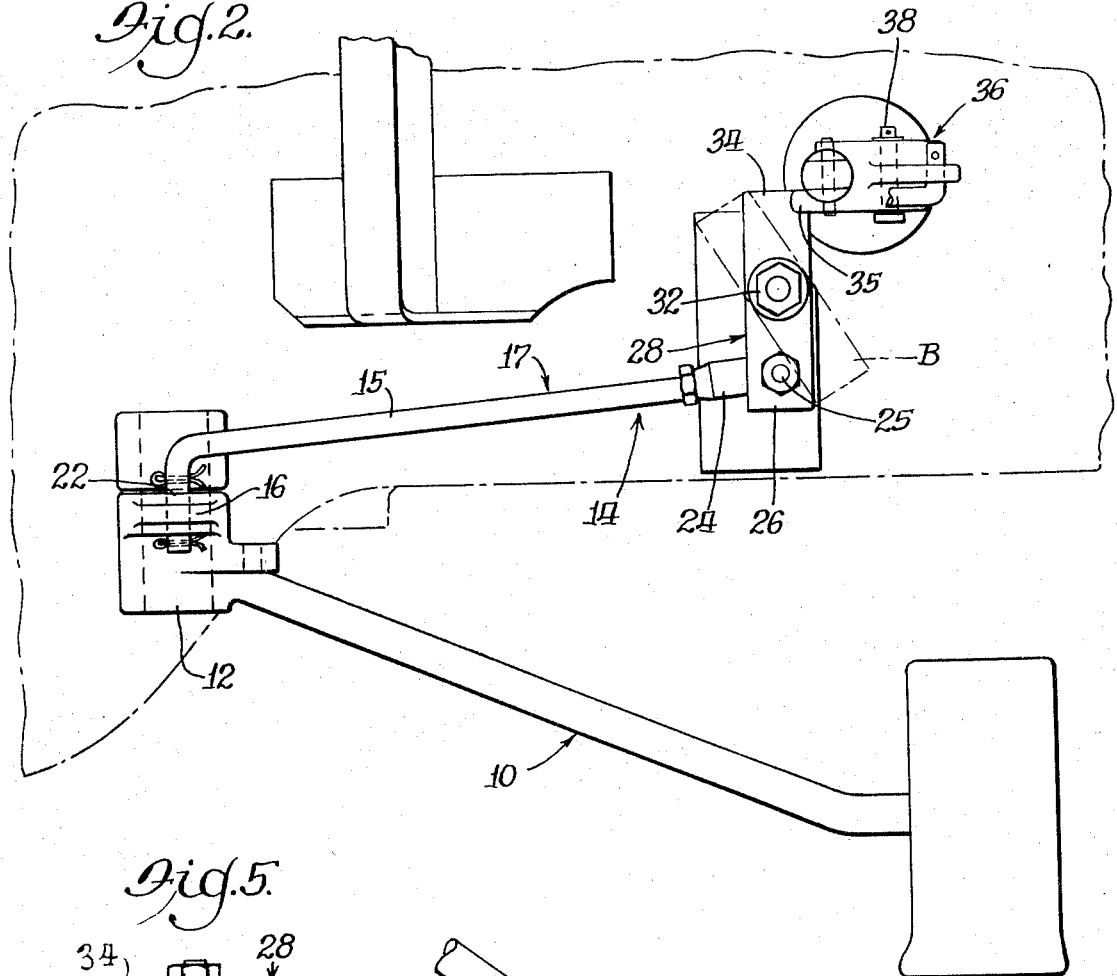
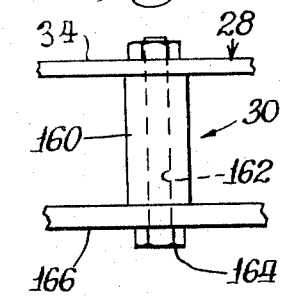
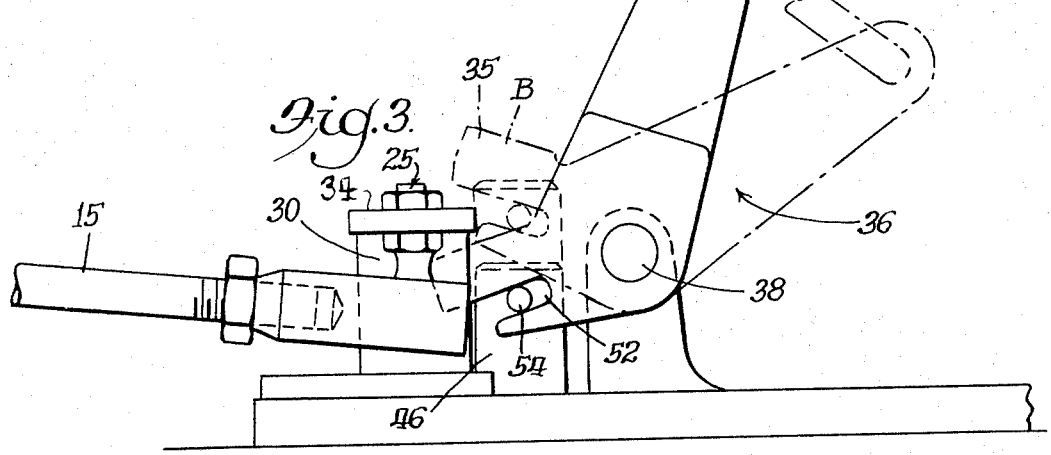

CLUTCH CONTROLLED TRANSMISSION SHIFT LOCK

BACKGROUND OF THE INVENTION

This invention relates to transmission assemblies and more particularly, to a transmission assembly incorporating a speed transmission, a dual hydraulic or synchronizing clutch and a master clutch wherein the input shaft and the countershaft of the speed transmission are in close proximity. Further, a coordinating means gears the actuation of the hydraulic clutch to that of the master clutch.

With increased emphasis on the design of a smaller, higher horsepower tractor, innumerable problems have arisen because of lack of available space. That is, the transmission design must be compact enough to fit within the space available, have a substantial working life, and be easily operated.

Another object of this invention is to provide a transmission assembly wherein the distance between the power transmission shafts is relatively small.

Yet, another object of this invention is to provide a transmission assembly wherein there is no gear tooth engagement clash.

Still another object of this invention is to provide a transmission assembly wherein the master clutch actuation force is relatively low, allowing continuous use without operator fatigue.

Yet another object of this invention is to provide a transmission assembly having a coordinating means linking the actuation of the hydraulic clutch with that of the master clutch.

Another object of this invention is to provide a transmission assembly having a dual hydraulic clutch capable of picking up the inertia of the assembly behind the flywheel during the operation cycle.

Yet another object of this invention is to provide a transmission assembly having a speed transmission, a dual hydraulic clutch and a master clutch in a single plane, and a PTO shaft in a relatively close plane.

Still another object of this invention is to provide a dual hydraulic clutch having quick shifting characteristics.

Still another object of this invention is to provide a compact, economical and efficient transmission assembly.

Yet another object of this invention is to provide a transmission assembly allowing very fast directional changes.

Still another object of this invention is to provide a transmission assembly wherein shifting does not require the lining up of gear noses.

Yet another object of this invention is to provide a multi-clutch pack transmission assembly having a means coordinating the engagement of said multi-clutch packs.

Another object of this invention is to provide a transmission assembly having two different clutch packs, one of which functions as a synchronizer.

This invention is directed to the combination of a master clutch, a dual hydraulic clutch and a coordinating means operating therebetween. In operation, the master clutch is disengaged, which allows the coordination means to be actuated such that the dual hydraulic clutch can be shifted. The coordination means includes a gate means and hydraulic spool actuating levers that pivot a hydraulic spool which, through high pressure fluid, engage a forward reverse gear set.

Other objects and many of the attendant advantages of this invention will be readily appreciated as the same becomes better understood by reference to the following detailed description when considered in connection with the accompanying drawings in which like reference numerals designate like parts throughout the figures thereof.

FIG. 2 is a top view of the coordination means;

FIG. 3 is a side view of the coordination means; and

FIG. 5 is an enlarged view of the pivotal mounting for a shift locking plate.

DESCRIPTION OF THE PREFERRED EMBODIMENT

Figure 1:
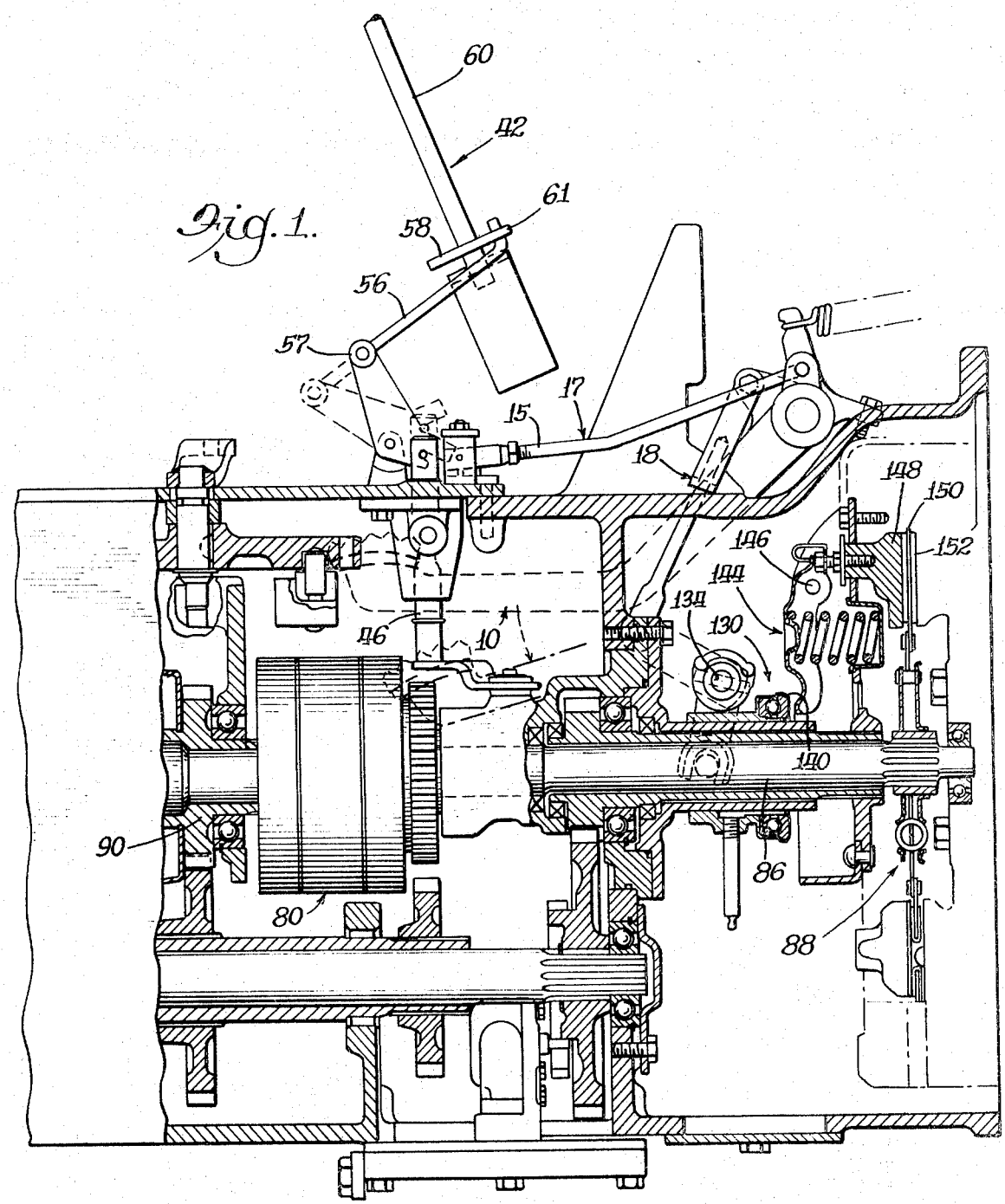
FIG. 1 is a side view of the coordination means, and the hydraulic and master clutch actuation means.

Referring to the drawings and more particularly to FIGS. 1 and 2 wherein: the clutch pedal or bell crank lever means 10 pivots around shaft 12 causing a gear coordination means 14 to reciprocate while engaging or disengaging the master clutch 88 through link means 18.

As shown in FIG. 2, gear coordination means 14 includes a clutch actuated gate means 17 that comprises link 15 having first end 22 fixed to output lever or ear 16 of clutch pedal 10 and second end 24 pivotally secured to end 26 of plate lever means 28 by a bolt and nut means 25. The plate lever means 28 pivots atop shaft means 30, which is suitably anchored at center section 32, causing end 34 to pivot in the major plane thereof, but in a direction opposite to that of end 26. More specifically, shaft means 30, as shown in FIG. 5, includes a bearing means 160 having a bore 162 extending the length thereof which receives a nut and bolt means 164. As is apparent, bearing means 160 may be welded to deck plate means 166 such that plate means 28 pivots thereatop, or bearing 160 and plate 28 may be secured as a unit which, in turn, pivots on deck plate 166. In either assembly, nut and bolt means 164, when securing the assembly, must provide sufficient clearance between the means such that they do not frictionally bind.

A second bellcrank lever or spool actuation means 36 pivots around pin 38 to strike out a second plane such that output lever 35 passes through the first plane formed by end 34 of plate means 28 as it is pivoted around shaft 30. It is thus apparent that when clutch pedal means 10 is in an engaged position, end 34 intersects the plane swept out by output lever 35 of second bellcrank 36 and so restricts movement thereof. When the clutch means 10 is in a disengaging position (Phantom B) it is apparent that end 34 has been pivoted and no longer intersects the plane of bellcrank 36 thereby allowing pivotal movement thereof.

The bellcrank lever means 36 comprises the lower section of forward-reverse handle means 42 as shown in FIG. 1. The output lever 35 being linked to hydraulic spool control link means 46 of a hydraulic valve (not shown). The connection involves a gap 52 cut in output lever 35 wherein pin 54, fixed to spool control link 46, slides in a controllable manner. Thus, when crank means 36 pivots into phantom position B, spool link 46 is pulled upward re-directing the hydraulic fluid in the valve (not shown).

The link means 56 is pivotally fixed to input lever means 57 and to the outer edge portion 61 of a rotatable plate 58 which is securely fixed to a selector means 60. Thus, as selector 60 is rotated around its major axis, plate 58 also rotates and, in turn, pulls link 56 toward or pushes it backwards. Bellcrank 36 thereby can be moved from the downward to the phantom B position or vice versa. Thus, it is apparent that forward-reverse selector handle means 42 cannot be actuated unless and until the clutch pedal means 10 is depressed to pivot end 34 of plate means 28 out of the plane of output lever 35.

Figure 4:
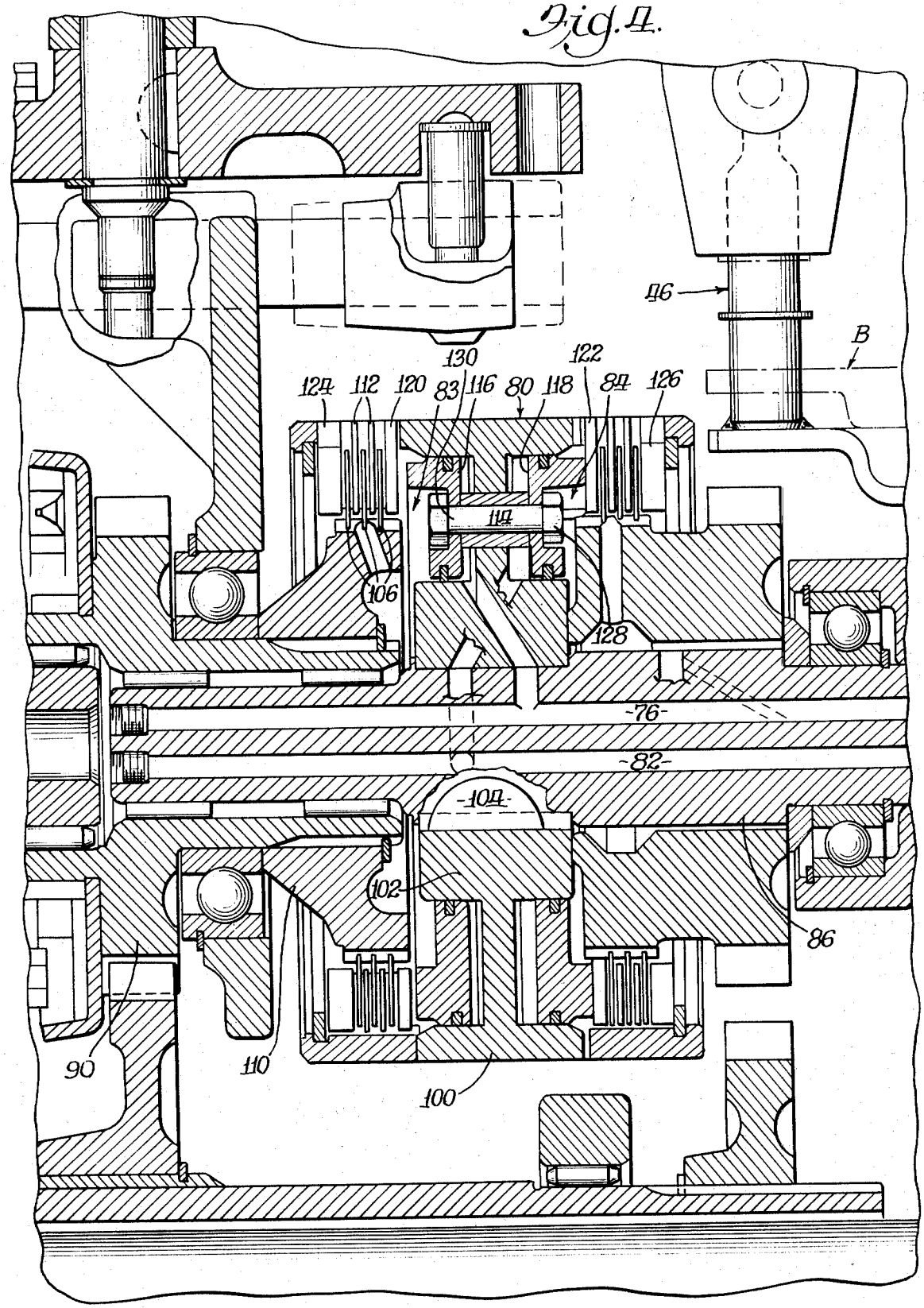
FIG. 4 is a cross section of the dual hydraulic clutch pack in a reverse drive engagement.

The porting and channeling of hydraulic valve (not shown) is such that when spool control link 46 is in the down position, as shown in FIG. 4, hydraulic fluid is pumped by a live pump (not shown) through conduit means 82 to engage the reverse gear means 84 of hydraulic clutch means 80.

A corresponding porting and channeling systems exists whereby when spool control link 46 is in the up position, as shown by phantom B, hydraulic fluid is pumped through conduit means 76 to engage the forward gear means 83 of hydraulic clutch means 80.

With reference to the functioning of the structure so far discussed and referring to FIG. 1, forwardly of power input shaft 86 is a heavy duty clutch means 88 and rearwardly thereof is a change speed transmission (not shown) to which power is delivered by quill shaft or countershaft 90 for forward motion and reversed idler gear (not shown) for reversed motion. A radial drum 100, shown in FIG. 4, rotatably driven by input shaft 86 through a web portion 102 which is constrained for rotation with said shaft 86 by key means 104, carries the forward and reversed clutch means 83 and 84. Forward gear means 83 couples quill shaft 90 with power input shaft 86 utilizing friction discs 106, which are carried by direct drive hub 110, and external splines 112, which are carried by radial drum 100. In operation, external splines 112 and friction discs 106 are compressed together whereby force is transferred therebetween.

The second or reversed gear means 84 is similar in design and is employed to transfer power from input shaft 90 through the reversed idler gear (not shown), and then to the change speed transmission (not shown). As is apparent when either the reversed or forward gear means is engaged, the other will be free wheeling.

The reverse and forward gear means 84 and 83 are joined by a common connecting means 114 which insures alternative engagement thereof. Fluid pressure behind piston means 116 or 118 creates power chambers which will cause frictional engagement of the corresponding friction disc set by compressing same between washer restraining means 120 or 122 and abutment means 124 or 126. The configuration of connecting means 114 provides suitable abutting means to drive the particular piston means into an engaging position and is provided, in the preferred embodiment with a key type unit 128 for assembling with a bolt 130. As is apparent, the hydraulic valve (not shown) is provided with a channeling mode whereby when the gears are shifted, the hydraulic fluid in the disengaged system is drained to dump.

A master clutch pack means 132 as provided is engaged and disengaged by actuation of clutch pedal means 10. Referring to FIG. 2, as master clutch pedal means 10 is depressed, pivot means 134 slides cylindrical means 136 forward. The leading edge 140 of cylindrical 136 engages spring loaded pivot means 144 forcing said means to pivot around point 146 such that forcing means 148 is withdrawn from compressing master clutch blade means 150 against flywheel 152.

As an example of operation assume that the operator of the vehicle is backing away from a material pile just prior to shifting into a forward gear. The first step involved is the depression of the clutch pedal 10 thereby disengaging the master clutch 88. The hydraulic pump, however, since it is driven by the PTO drive is not effected and so continues to function. Thus, as the vehicle continues to roll backwards the transmission assembly is driven by the wheels.

As the operator depressed the clutch pedal 10 in the first step it is apparent that the coordination means 14 unlocked the spool actuation means. The second step thus involves the operator moving the shifting lever 42 from reverse to forward, thereby actuating the forward gear set of the dual hydraulic clutch 80. At this point the transmission assembly back of the dual hydraulic clutch 80 is still being driven by the wheels, but the direction of the shaft 86, in front of the hydraulic clutch 80, carrying the master clutch has been reversed. As is apparent, the mass of the shaft 86 and master clutch 88 is relatively small such that the forces placed on the hydraulic clutch 80 do not generate excessive heat or wear. At this point the hydraulic clutch 80 has engaged the gears necessary for forward motion and all that remains is that the master clutch 88 be re-engaged with the engine overcoming the driving action of the wheels. It should be understood that the dual hydraulic clutch 80 can carry normal single direction forces, however, because of the high temperatures and wear associated with gear shifts, it must be free wheeling during this period.

The third step includes the release of the master clutch pedal 10 re-engaging the master clutch 88 and the relocking of the hydraulic clutch coordination means 14. It is apparent that as the master clutch 88 is engaged a substantial amount of friction generated heat and wear occur before the driving forces of the wheels are overcome and the vehicle assumes a forward direction. Because the master clutch 88 so overcomes a majority of shock, the operator, by his own control, can determine the speed at which he so engages it and to some extent, exercise a degree of control thereover. Further the master clutch 88 is provided with a four pedal drive member for longer wear and better heat dissipate.

Thus, it is apparent that there has been provided, in accordance with the invention, a transmission assembly that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A combination manual and hydraulic clutch assembly comprising:
   a dual hydraulic clutch;
   a master clutch being periodically engaged;
   a coordination means linked between dual hydraulic clutch and said master clutch including:
   a bellcrank lever clutch means having an input lever means and an output lever means; a gate means, having first and second end means, pivotally secured to a shaft means whereby said gate means can pivot in a plane perpendicular to said shaft; a link means connecting said output lever and said first end; a bellcrank lever spool actuating means having an input lever and an output lever said input lever being fixed to a gear selector means, said output lever having a gap means whereby upon actuation of said gear selector means said bellcrank lever spool actuating means pivots in a plane perpendicular to that of said gate means intersecting it, and a spool linking means having a projection means slidingly received in said gap whereby upon movement of said second end said output lever can pass thereby to cause fluid to be directed to said hydraulic clutch.

2. A combination manual and hydraulic clutch assembly comprising:
   dual hydraulic clutch means including a live pump means, a hydraulic valve having a control spool means, and means for actuating said control spool,
   master clutch means being periodically engaged including: clutch pedal means, and a multi-paddle driving means,
   coordination means linked between said dual hydraulic clutch and said master clutch, whereby said master clutch must be disengaged before said hydraulic clutch can be shifted including: a gate means, a link means connecting said clutch pedal means to said gate means, a spool actuating means whereby said spool actuating means is operable only when said master clutch is disengaged.

3. A combination manual and hydraulic clutch assembly comprising:
   dual hydraulic clutch including two hydraulic piston means interconnected whereby engagement of one causes disengagement of the other; a fluid energy producing means; and valving means connecting said piston means and said fluid producing means;
   master clutch being periodically engaged;
   coordination means linked between said dual hydraulic clutch and said master clutch including a gate means operating in a first plane, a link means and a lever means which disengages said master clutch and actuates said link through said gate;
   a spool actuating means operating in a second plane perpendicular to said first whereby causing the direction of high pressure fluid to said dual hydraulic clutch;
   a spool linking means whereby said master clutch must be disengaged before said hydraulic clutch can be shifted.

4. A combination manual and hydraulic clutch assembly comprising:
   dual hydraulic clutch including two hydraulic piston means interconnected whereby engagement of one causes disengagement of the other; a fluid energy producing means; and valving means connecting said piston means and said fluid producing means;
   master clutch being periodically engaged;
   coordination means linked between said dual hydraulic clutch and said master clutch including a gate means operating in a first plane, a link means and a clutch pedal means which disengages said master clutch and actuates said link through said gate;
   a spool actuating means operating in a second plane perpendicular to said first whereby causing the direction of high pressure fluid to said dual hydraulic clutch;
   a spool linking means whereby said master clutch must be disengaged before said hydraulic clutch can be shifted.

5. The clutch assembly of claim 4 wherein said master clutch includes multi-paddles driving means having at least four paddles.

6. The shift assembly of claim 4 wherein:
   said gate means is a flat plate centrally pivotable; and
   said spool actuating means is a bellcrank lever having an input lever means and an output lever means, said output lever means being slidingly secured to said spool linking means, said input lever being secured to a gear selector means.

* * * * *